(12) United States Patent
Goutines et al.

(10) Patent No.: US 7,392,651 B2
(45) Date of Patent: Jul. 1, 2008

(54) TURBOMACHINE NOZZLE COVER FOR REDUCING JET NOISE

(75) Inventors: Marius Goutines, Melun (FR); Jacques Michel Albert Julliard, Hericy sur Seine (FR); Pierre Loheac, Brie Comte Robert (FR); Frédéric Raymond Jean Miroudot, Brie sur Marne (FR); Jean-Michel Nogues, Chatelet En Brie (FR); Stéphane Thomas, Melun (FR)

(73) Assignee: Snecma, Paris (FR)

( * ) Notice: Subject to any disclaimer, the term of this patent is extended or adjusted under 35 U.S.C. 154(b) by 442 days.

(21) Appl. No.: 11/178,476

(22) Filed: Jul. 12, 2005

(65) Prior Publication Data

US 2006/0010853 A1 Jan. 19, 2006

(30) Foreign Application Priority Data

Jul. 13, 2004 (FR) .................................. 04 07792

(51) Int. Cl.
*F02K 1/46* (2006.01)
(52) U.S. Cl. ...................... 60/262; 60/264; 239/265.17; 239/265.19; 181/213; 181/220
(58) Field of Classification Search .................. 60/262, 60/264; 239/265.17, 265.19; 181/213, 220
See application file for complete search history.

(56) References Cited

U.S. PATENT DOCUMENTS

| 3,568,792 | A | * | 3/1971 | Urquhart | ............... 239/265.19 |
| 3,664,455 | A | | 5/1972 | Duvvuri | |
| 4,045,957 | A | * | 9/1977 | DiSabato | ..................... 60/262 |
| 4,175,640 | A | | 11/1979 | Birch et al. | |
| 4,576,002 | A | | 3/1986 | Mavrocostas | |
| 6,314,721 | B1 | * | 11/2001 | Mathews et al. | ............... 60/264 |
| 6,578,355 | B1 | * | 6/2003 | Mundt | ......................... 60/262 |
| 6,606,854 | B1 | * | 8/2003 | Siefker et al. | ................. 60/262 |
| 2002/0178711 | A1 | * | 12/2002 | Martens | ..................... 60/226.1 |

FOREIGN PATENT DOCUMENTS

EP 0 984 152 A2 3/2000

OTHER PUBLICATIONS

European Search Report, French Appl. FR 0407792, Mar. 4, 2005.

* cited by examiner

*Primary Examiner*—Ted Kim
(74) *Attorney, Agent, or Firm*—Oblon, Spivak, McClelland, Maier & Neustadt, P.C.

(57) ABSTRACT

A cowl for a turbomachine nozzle, the cowl having a plurality of repeated patterns disposed circumferentially at a trailing edge, each pattern being asymmetrical about a midplane of the pattern containing a longitudinal axis of the cowl, and each pattern having a first portion inclined radially towards the inside of the cowl and a second portion inclined radially towards the outside of the cowl.

23 Claims, 2 Drawing Sheets

TURBOMACHINE NOZZLE COVER FOR REDUCING JET NOISE

BACKGROUND OF THE INVENTION

The present invention relates to the general field of nozzles fitted to turbomachines. The invention relates more particularly to a separate stream nozzle having at least one of its cowls provided with patterns for reducing the jet noise generated on leaving the nozzle.

Separate stream nozzles for turbomachines are generally made up of a primary cowl, a secondary cowl disposed concentrically around the primary cowl so as to define a first annular channel for passing an outer stream (or cold stream), and a central body disposed concentrically inside the primary cowl so as to define a second annular channel for passing an inner stream (or hot stream).

One of the known solutions for reducing jet noise at the outlet from such a nozzle is to encourage mixing between the hot and cold streams coming from the turbomachine. The difficulty of the problem lies in controlling the characteristics of the mixing to be obtained between the hot and cold streams, given that one consequence of mixing too suddenly is an undesirable increase in levels of turbulence in the near field of the discharge. Such an increase has a negative influence on the potential for reducing noise in mixing zones that are further away. Thus, mixing between the streams must be as effective as possible, while satisfying constraints and criteria concerning both aerodynamic and acoustic efficiency.

To this end, it is well known to provide one of the cowls of the nozzle with a plurality of repeated patterns distributed around the entire circumference of the trailing edge of the cowl. By putting such patterns into place at the trailing edge of the nozzle cowl, the streams are caused to mix together by creating contrarotating longitudinal vortices.

For example, European patent application EP 0 913 567 provides for fitting the trailing edge of the primary cowl of the nozzle with a plurality of repeated patterns of triangular shape (referred to as chevrons) that encourage mixing between the hot and cold streams. Similarly, publication GB 2 355 766 proposes providing the trailing edges of the primary and secondary cowls of the nozzle with a plurality of repeated patterns of trapezoidal shape (refereed to as crenellations).

Although encouraging mixing between these streams, the patterns mentioned above nevertheless present drawbacks. A pattern of symmetrical shape (such as triangles or crenellations) at the trailing edge of at least one of the cowls of the nozzle causes each pattern to generate two contrarotating longitudinal vortices of equivalent intensity that are relatively close to each other. Over the entire circumference of the nozzle cowl, that is equivalent to a plurality of pairs of vortices that compensate mutually. That results in mixing between the streams that is not very effective, particularly in the zones that are furthest away from the ejection.

OBJECT AND SUMMARY OF THE INVENTION

The present invention thus has a main aim of mitigating such drawbacks by proposing a cowl for a separate stream nozzle that enables mixing between the hot and cold streams to be made more effective so as to reduce jet noise at the outlet from the nozzle.

To this end, the invention provides a cowl for a turbomachine nozzle, the cowl having a plurality of repeated patterns disposed circumferentially at a trailing edge, wherein each pattern is asymmetrical about a midplane of the pattern containing a longitudinal axis of said cowl, and wherein each pattern comprises a first portion inclined radially towards the inside of the cowl and a second portion inclined radially towards the outside of the cowl.

At each pattern, since the two vortices generated are of different intensities, the vortices no longer compensate over the entire circumference of the cowl. This results in the entire flow being set into rotation in zones that are furthest from the point of discharge, with the consequence of mixing taking place more effectively between the streams and with jet noise being reduced better, particularly at low frequencies.

Furthermore, the asymmetry of the patterns enables the jet to be destroyed in the near field of the discharge, and thus contributes more effectively to reducing jet noise, particularly at high frequencies.

More precisely, the first portion of each pattern extends longitudinally over a distance that is greater than the distance over which the second portion of said pattern extends.

The inclination distance of the first portion of each pattern is preferably greater than the inclination distance of the second portion so that penetration into the inner stream is greater than penetration into the outer stream.

The inclination distances of the first and second portions of each pattern can lie in the range 5% to 30% of the respective distances over which the first and second portions extend longitudinally.

The first portion of each pattern may extend longitudinally over a distance that is greater than half the circumferential distance occupied by one pattern. Similarly, the second portion of each pattern may extend longitudinally over a distance that is less than half the circumferential distance occupied by one pattern.

According to an advantageous characteristic of the invention, the patterns are fin-shaped.

The patterns at the trailing edge of one of the cowls of the nozzle may be disposed symmetrically about a vertical plane containing the longitudinal axis of the nozzle.

A gap that does not have any patterns can be provided in the trailing edge of the cowl in the vicinity of the zone where said cowl is connected to a support pylon.

The present invention also provides a turbomachine nozzle in which the primary cowl and/or the secondary cowl is a cowl as defined above.

The present invention also provides a turbomachine including a nozzle as defined above.

BRIEF DESCRIPTION OF THE DRAWINGS

Other characteristics and advantages of the present invention appear from the following description made with reference to the accompanying drawings which show an embodiment that has no limiting character. In the figures.

DETAILED DESCRIPTION OF AN EMBODIMENT

Figure 1:
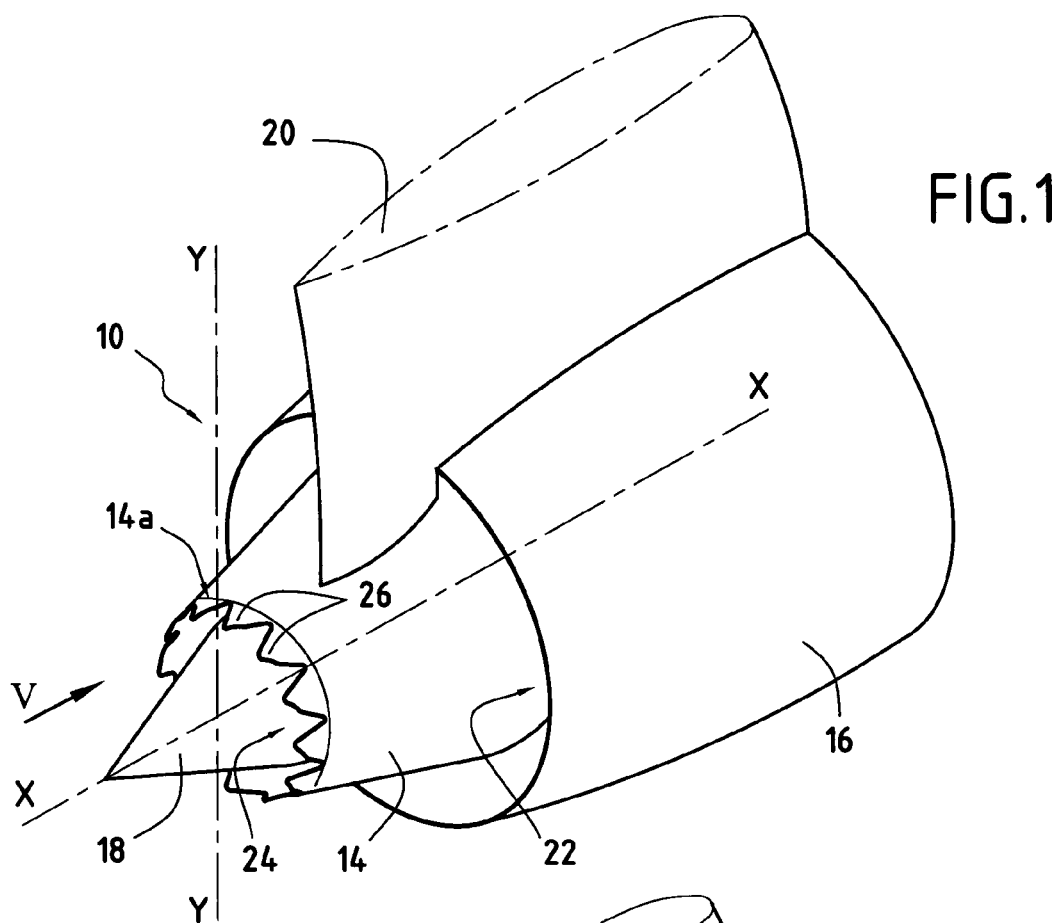
FIG. 1 is a perspective view of a turbomachine nozzle fitted with a cowl constituting an embodiment of the invention.

FIG. 1 is a perspective view of a separate stream nozzle 10 of a turbomachine. The nozzle 10 is axially symmetrical in shape about its longitudinal axis X-X being typically formed by a primary cowl 14, a secondary cowl 16, and a central body 18 centered on the longitudinal axis X-X of the nozzle.

The primary cowl 14 is substantially cylindrical or frustoconical in shape, extending along the longitudinal axis X-X of the nozzle. The central body 18 is placed concentrically inside the primary cowl 14 and terminates in a portion that is substantially conical.

The secondary cowl 16 is also substantially cylindrical or frustoconical in shape and surrounds the primary cowl 14 concentrically, extending along the longitudinal axis X-X of the nozzle.

It should be observed that the longitudinal axis X-X of the nozzle coincides with the longitudinal axes of the primary and secondary cowls 14 and 16.

The separate stream nozzle as defined in this way is held below an airplane wing (not shown in the figures) by a support pylon 20 engaging the secondary cowl 16 of the nozzle and extending inside the secondary cowl as far as the primary cowl 14.

The concentric assembly of the elements of the nozzle 10 serves to define: firstly, between the primary and secondary cowls 14 and 16, a first annular channel 22 for passing the air that comes from the turbomachine (also referred to as the secondary flow or the cold flow); and secondly between the primary cowl 14 and the central body 18, a second annular channel 24 for passing an inner gas flow coming from the turbomachine (also referred to as the primary flow or the hot flow).

The inner and outer gas flows passing along these two annular channels 22 and 24 mix together at the trailing edge 14a of the primary cowl 14.

In FIG. 1, it can be seen that the central body 18 of the nozzle 10 is of the external type, i.e. that the central body 18 extends longitudinally beyond the trailing edge 14a of the primary cowl 14.

Nevertheless, the invention can also be applied to a nozzle of the internal type in which the trailing edge of the primary cowl extends longitudinally beyond the central body so as to cover it completely.

At least one of the cowls 14, 16 of the nozzle 10 (in FIG. 1 the primary cowl 14) has a plurality of repeated patterns 26 for reducing jet noise at the outlet from the nozzle. These patterns 26 are disposed circumferentially around the trailing edge 14a of the primary cowl 14.

In the invention, each pattern 26 is asymmetrical about a midplane P of the pattern containing the longitudinal axis X-X. In addition, each pattern 26 has a first portion 26a that is inclined radially towards the inside of the primary cowl 14, and a second portion 26b that is inclined radially towards the outside of the primary cowl 14.

Figure 2:
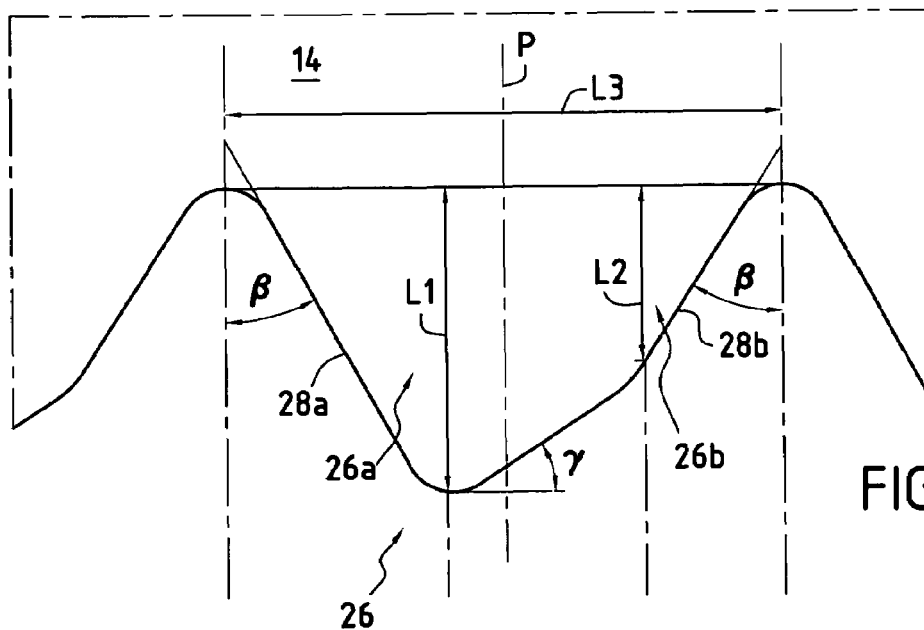
FIG. 2 is an enlarged view of a jet noise reduction pattern fitted to the FIG. 1 nozzle.
Figure 3:
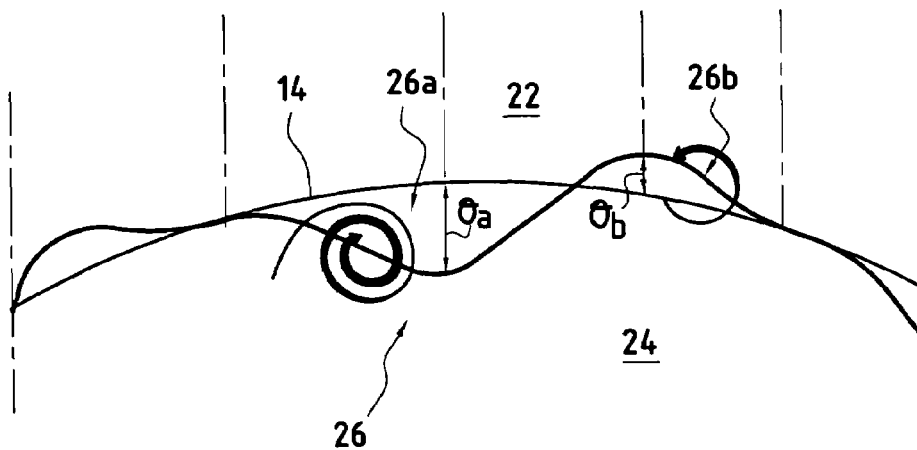
FIG. 3 is an end view of the FIG. 2 noise reduction pattern.

These two particular characteristics of the jet noise reduction patterns 26 of the invention are shown in FIGS. 2 and 3.

In particular, the plane P shown in FIG. 2 corresponds to the midplane of the jet noise reduction pattern 26, said plane P containing the longitudinal axis X-X (not shown in the figure). Relative to this plane P, the shape of the pattern 26 is asymmetrical.

The midplane P divides the pattern 26 into two portions: a first portion 26a which is inclined radially towards the inside of the primary cowl 14 (i.e. into the inner stream), and a second portion which is inclined radially towards the outside of the cowl 14, i.e. into the outer stream.

In outline, the pattern 26 is generally in the shape of a quadrilateral, and is preferably somewhat in the shape of a shark's fin, with its base being common with the cowl 14. The sides 28a and 28b of this quadrilateral pattern 26 are each at an angle β lying in the range 15° to 45° relative to the longitudinal axis X-X. This angle β is preferably about 30°.

Furthermore, as can be seen in FIG. 2, the quadrilateral forming the pattern 26 presents rounded corners to avoid causing mixing to take place too suddenly between the hot and cold streams.

According to an advantageous characteristic of the invention, the first portion 26a of each pattern 26 extends longitudinally over a distance L1 that is greater than that the distance L2 over which the second portion 26b of the pattern extends longitudinally. As a result, the pattern 26 can penetrate further into the inner stream than into the outer stream.

In such a configuration, the side of the quadrilateral forming the pattern 26 that is opposite from its base forms an angle γ e.g. lying in the range 15° to 45° relative to an axis perpendicular to the longitudinal axis X-X, and preferably this angle γ is about 30°.

In addition, the first portion 26a of each pattern 26 extends longitudinally over a distance L1 that is preferably greater than half the circumferential distance L3 occupied by one pattern. The distance L3 corresponds to the length of the base of the quadrilateral forming the pattern. For example, the distance L1 can thus be equal to about 0.6 times the distance L3.

Similarly, the second portion 26b of each pattern 26 extends longitudinally over the distance L2 that is preferably less than half the circumferential distance L3 occupied by one pattern. By way of example, the distance L2 can thus be equal to about 0.3 times the distance L3.

The respective radial inclinations of the first and second portions 26a and 26b of the jet noise reduction patterns 26 are shown in FIG. 3.

In this figure, the end of the first portion 26a of the pattern is inclined radially towards the inside of the cowl 14, i.e. towards the inner stream flow channel 24, over an inclination distance $θ_a$. The end of the second portion 26b of the pattern is inclined radially outwards from the cowl 14, i.e. towards the outer stream flow channel 22, over an inclination distance $θ_b$.

According to another advantageous characteristic of the invention, the inner penetration distance $θ_a$ of the first portion 26a of each jet noise reduction pattern 26 is greater than the outer penetration distance $θ_b$ of the second portion 26b of the pattern. As a result, the pattern 26 can penetrate to a greater extent into the inner stream than into the outer stream.

As an indication, the inner penetration distance $θ_a$ of the first portion 26a of the pattern may represent 5% to 20% of the longitudinal distance L1 over which this pattern portion extends. Similarly, and still by way of example, the outer penetration distance $θ_b$ of the second portion 26b of the pattern may correspond to 3% to 15% of the longitudinal distance L2 over which said second portion extends.

Still with reference to FIG. 3, it can clearly be seen that the special shape of the nozzle noise reduction patterns 26 of the invention generates two contrarotating longitudinal vortices of different intensities at each pattern. The intensities of these two vortices therefore do not compensate.

Over the entire cowl provided at its trailing edge with these noise reduction patterns, the entire flow is set into rotation in zones that are furthest from the discharge, and that is favorable to achieving more effective mixing between the inner and outer streams.

Figure 4:
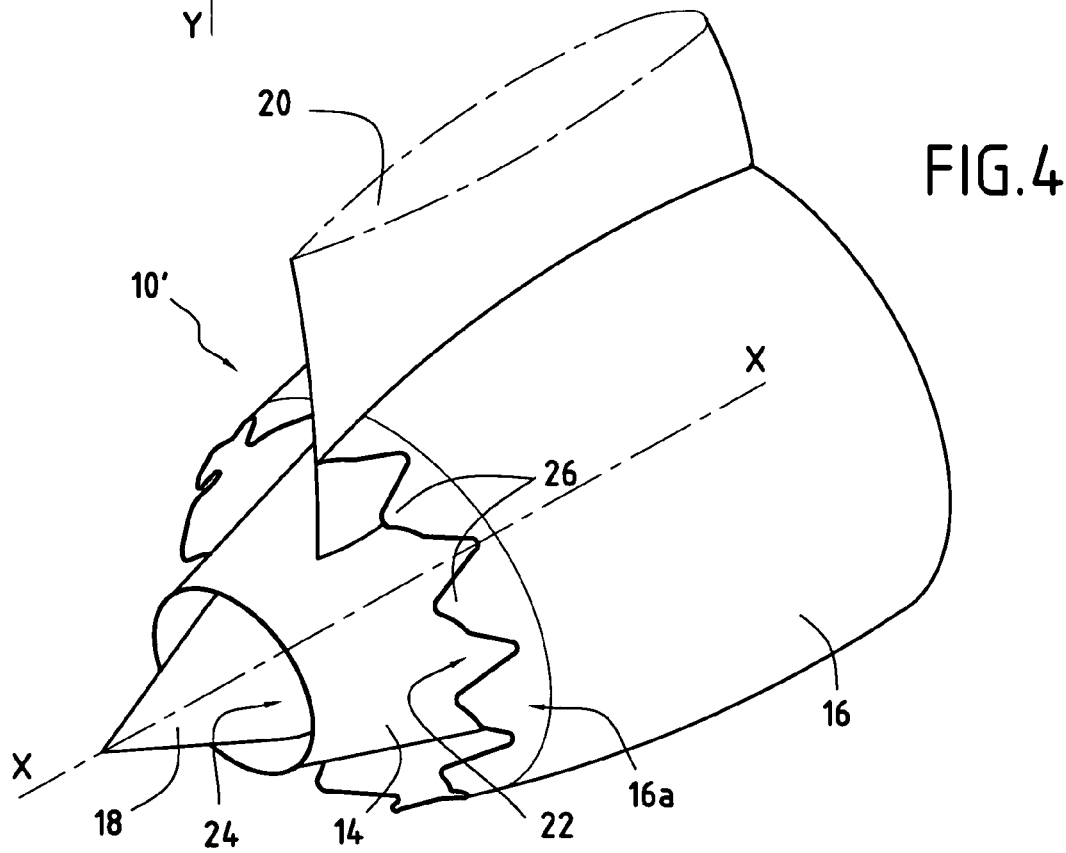
FIG. 4 is a perspective view of a turbomachine nozzle fitted with a cowl constituting another embodiment of the invention.

FIG. 4 shows a turbomachine nozzle 10' constituting another embodiment of the invention.

Compared with the embodiment described above, the jet noise reduction patterns 26 of this nozzle 10' are not located on the primary cowl 14, but on the trailing edge 16a of the secondary cowl 16.

In this configuration, the patterns 26 serve to encourage mixing between the cold gas stream passing along the first channel 22 defined by the primary and secondary cowls 14 and 16 of the nozzle 10' and the flow of air passing along the outside wall of the secondary cowl 16.

The shape and the particular disposition of these jet noise reduction patterns 26 are entirely identical to those described with reference to FIGS. 1 to 3.

In FIG. 4, it can be seen that the jet noise reduction patterns 26 are not disposed around the entire circumference of the trailing edge of the secondary cowl. A pattern-free gap is left in the zone where the nozzle 10' is connected to the support pylon 20 so as to enable it to be secured.

Figure 5:
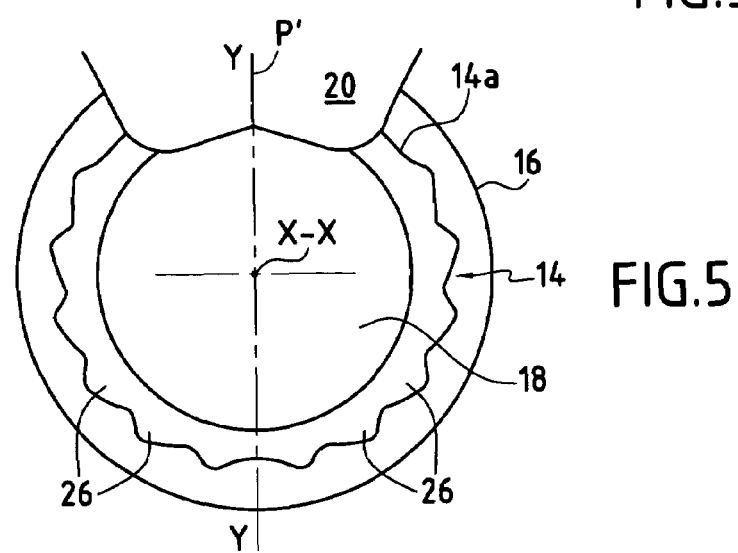
FIG. 5 is an end view of a turbomachine nozzle constituting yet another embodiment of the invention.

In yet another embodiment of the invention, as shown in FIG. 5, the noise reduction patterns 26 can be placed on the trailing edge of the nozzle cowls (FIG. 4 shows the primary cowl 14), while maintaining symmetry about a vertical plane P' containing the longitudinal axis X-X. The plane of symmetry P' is defined in the top portion of the cowl by the support pylon 20, and in the bottom portion by a special shape for the pattern 26, which shape may, for example, be the result of assembling together two half-fins.

In yet another embodiment of the invention (not shown in the figures), the jet noise reduction patterns can be provided both on the primary cowl and on the secondary cowl of the nozzle.

In general, it should be observed that the shape and the number of jet noise reduction patterns provided around the circumference of the trailing edge of the cowl (whether primary or secondary) can be varied. In particular, the angular positions and the asymmetry relative to the respective midplanes P, the characteristic lengths L1 and L2 of their two portions, and the extent to which the patterns penetrate into the inner and outer streams can differ depending on the application.

What is claimed is:

1. A cowl for a turbomachine nozzle, the cowl having a plurality of repeated patterns disposed circumferentially at a trailing edge, wherein each pattern is asymmetrical about a midplane of the pattern containing a longitudinal axis of said cowl, wherein each pattern comprises a first portion inclined radially towards the inside of the cowl and a second portion inclined radially towards the outside of the cowl, and wherein each pattern is in a shape of a quadrilateral having a base common with said cowl.

2. A cowl according to claim 1, wherein the first portion of each pattern extends longitudinally over a distance that is greater than the distance over which the second portion of said pattern extends.

3. A cowl according to claim 1, wherein the inclination distance of the first portion of each pattern is greater than the inclination distance of the second portion of said pattern.

4. A cowl according to claim 1, wherein the inclination distances of the first and second portions of each pattern lies in the range 5% to 30% of the respective distance over which each of said portions extends longitudinally.

5. A cowl according to claim 1, wherein the first portion of each pattern extends longitudinally over a distance greater than half the circumferential distance occupied by a pattern, and wherein the second portion of each pattern extends longitudinally over a distance that is less than half said circumferential distance occupied by a pattern.

6. A cowl according to claim 1, wherein the patterns are fin-shaped.

7. A cowl according to claim 1, wherein the patterns are disposed symmetrically about a vertical plane containing the longitudinal axis of the cowl.

8. A cowl according to claim 1, wherein a gap is provided in the trailing edge of the cowl having no pattern in the vicinity of the zone where said cowl is connected to a support pylon.

9. A turbomachine nozzle including a primary cowl disposed about a longitudinal axis of the nozzle, and a secondary cowl disposed concentrically around the primary cowl, wherein the primary cowl is a cowl according to claim 1.

10. A turbomachine including a nozzle according to claim 9.

11. A turbomachine nozzle including a primary cowl disposed about a longitudinal axis of the nozzle, and a secondary cowl disposed concentrically around the primary cowl, wherein the secondary cowl is a cowl according to claim 1.

12. A turbomachine nozzle including a primary cowl disposed about a longitudinal axis of the nozzle, and a secondary cowl disposed concentrically around the primary cowl, wherein the primary and secondary cowls are cowls according to claim 1.

13. A cowl according to claim 1, wherein said quadrilateral is delimited by four straight line segments.

14. A cowl according to claim 1, wherein said quadrilateral has its two diagonals inside said quadrilateral.

15. A cowl according to claim 1, wherein said quadrilateral has apexes opposed to said base, wherein said apexes correspond to respective longitudinal ends of the first and second portions of each pattern.

16. A cowl according to claim 1, wherein two adjacent patterns are not mirror-images of each other.

17. A cowl according to claim 1, wherein said quadrilateral has, in addition to said base in common with said cowl, three sides that form edges of said cowl.

18. A cowl according to claim 17, wherein a first side and a second side of said three sides each forms an angle β relative to said longitudinal axis, wherein said angle β is within a range of 15° to 45°.

19. A cowl according to claim 18, wherein said angle β is about 30°.

20. A cowl according to claim 18, wherein a third side of said three sides, opposite said base, forms an angle Y relative to an axis perpendicular to said longitudinal axis, wherein said angle Y is within a range of 15° to 45°.

21. A cowl according to claim 20, wherein said angle Y is about 30°.

22. A cowl according to claim 17, wherein said quadrilateral has rounded corners.

23. A turbomachine nozzle comprising a cowl according to claim 1, wherein said nozzle is axially symmetrical in shape about said longitudinal axis of said cowl.

\* \* \* \* \*